United States Patent
Tanaka

(10) Patent No.: US 11,285,936 B2
(45) Date of Patent: Mar. 29, 2022

(54) CONTROL DEVICE FOR HYBRID VEHICLE

(71) Applicant: TOYOTA JIDOSHA KABUSHIKI KAISHA, Toyota (JP)

(72) Inventor: Satoru Tanaka, Yokohama (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 189 days.

(21) Appl. No.: 15/981,538

(22) Filed: May 16, 2018

(65) Prior Publication Data
US 2018/0334157 A1 Nov. 22, 2018

(30) Foreign Application Priority Data

May 17, 2017 (JP) .............................. JP2017-098364

(51) Int. Cl.
*B25J 9/16* (2006.01)
*B60W 20/12* (2016.01)
(Continued)

(52) U.S. Cl.
CPC ............... *B60W 20/12* (2016.01); *B60K 6/20* (2013.01); *B60K 6/445* (2013.01); *B60W 10/06* (2013.01);
(Continued)

(58) Field of Classification Search
CPC .. B60W 20/12; B60W 10/06; B60W 50/0097; B60W 10/08; B60W 50/0098;
(Continued)

(56) References Cited

U.S. PATENT DOCUMENTS 6,170,587 B1 * 1/2001 Bullock .................. B60K 6/12
180/69.6
6,314,347 B1 * 11/2001 Kuroda .................. B60L 50/61
701/22
(Continued)

FOREIGN PATENT DOCUMENTS

JP 2007-50888 3/2007
JP 2007050888 A * 3/2007
(Continued)

OTHER PUBLICATIONS

JP-2009023637-A Translation (Year: 2009).*
JP 2007050888A Translation (Year: 2007).*

*Primary Examiner* — Jeff A Burke
*Assistant Examiner* — Kyle T Johnson
(74) *Attorney, Agent, or Firm* — Finnegan, Henderson, Farabow, Garrett & Dunner, LLP

(57) ABSTRACT

A control device for a vehicle comprises a projected driving route calculating part calculating a projected driving route up to a destination, a target charge amount setting part setting a target amount of charge of the battery at each point on the projected driving route, an operating schedule setting part setting the operating schedule of the internal combustion engine and rotary electrical machine so that the amount of charge of the battery becomes the target amount of charge, and an operating schedule resetting part resetting an operating schedule when the difference between the amount of charge of the battery and the target amount of charge becomes a reset request value or more. The operating schedule resetting part is configured so as to reduce the reset request value when the remaining distance on the projected driving route is short compared to when it is long.

3 Claims, 10 Drawing Sheets

(51) Int. Cl.
*G01C 21/34* (2006.01)
*B60W 20/13* (2016.01)
*B60K 6/20* (2007.10)
*B60W 50/00* (2006.01)
*B60W 10/08* (2006.01)
*B60W 10/06* (2006.01)
*B60K 6/445* (2007.10)

(52) U.S. Cl.
CPC ............ *B60W 10/08* (2013.01); *B60W 20/13* (2016.01); *B60W 50/0097* (2013.01); *B60W 50/0098* (2013.01); *G01C 21/3407* (2013.01); *G01C 21/3469* (2013.01); *B60W 2050/0075* (2013.01); *B60W 2520/04* (2013.01); *B60Y 2200/92* (2013.01); *Y10S 903/93* (2013.01)

(58) Field of Classification Search
CPC ......... B60W 20/13; B60W 2050/0075; B60W 2520/04; B60K 6/445; B60K 6/20; G01C 21/3407; G01C 21/3469; Y10S 903/93; B60Y 2200/92
See application file for complete search history.

(56) References Cited

U.S. PATENT DOCUMENTS

| | | | |
|---|---|---|---|
| 8,682,517 B2 * | 3/2014 | Iida | H02J 7/0016 701/22 |
| 10,421,369 B2 * | 9/2019 | Ueki | H02J 7/1446 |
| 2003/0080565 A1 * | 5/2003 | McCullough | F02N 11/0807 290/1 R |
| 2005/0003925 A1 * | 1/2005 | Wakashiro | B60K 6/543 477/2 |
| 2005/0040789 A1 * | 2/2005 | Salasoo | B60L 3/12 320/119 |
| 2008/0077339 A1 * | 3/2008 | Seo | B60L 58/26 702/63 |
| 2008/0319597 A1 * | 12/2008 | Yamada | B60W 20/11 701/22 |
| 2010/0152937 A1 * | 6/2010 | Yamada | B60L 58/12 701/22 |
| 2011/0022255 A1 * | 1/2011 | Yamada | B60W 20/11 701/22 |
| 2011/0166733 A1 * | 7/2011 | Yu | B60W 50/082 701/22 |
| 2011/0202221 A1 * | 8/2011 | Sobue | B60K 16/00 701/22 |
| 2012/0153890 A1 * | 6/2012 | Takahashi | B60L 58/12 320/107 |
| 2013/0296132 A1 * | 11/2013 | Doering | B60W 10/08 477/86 |
| 2015/0046011 A1 * | 2/2015 | Imai | B60W 10/06 701/22 |
| 2016/0137185 A1 * | 5/2016 | Morisaki | B60K 6/445 701/22 |
| 2016/0221567 A1 * | 8/2016 | Ogawa | B60W 20/40 |
| 2018/0334157 A1 * | 11/2018 | Tanaka | B60W 10/08 |
| 2019/0366867 A1 * | 12/2019 | Gariepy | G05D 1/0225 |
| 2020/0047629 A1 * | 2/2020 | Cho | G01C 21/3469 |

FOREIGN PATENT DOCUMENTS

| | | | |
|---|---|---|---|
| JP | 2009023637 A | * | 2/2009 |
| JP | 2014-122033 | | 7/2014 |
| JP | 2015-80962 A | | 4/2015 |
| JP | 2016-196256 | | 11/2016 |

* cited by examiner

CONTROL DEVICE FOR HYBRID VEHICLE

CROSS-REFERENCE TO RELATED APPLICATION

This application claims priority based on Japanese Patent Application No. 2017-098364 filed with the Japan Patent Office on May 17, 2017, the entire contents of which are incorporated into the present specification by reference.

TECHNICAL FIELD

The present disclosure relates to a control device for a hybrid vehicle.

BACKGROUND ART

JP2007-50888A discloses as a conventional control device for a hybrid vehicle one which is configured to predict a driving pattern until a destination and to set an operating schedule for control of the distribution of drive powers of an internal combustion engine and motor until the destination and the amount of charge of the battery based on the predicted driving pattern so that the amount of fuel consumption of the internal combustion engine becomes minimum. This conventional control device for a hybrid vehicle is further configured to reset the operating schedule from the current position to the destination if the difference between the actual amount of charge of the battery detected during driving and the target amount of charge of the battery of the driving section included in the operating schedule exceeds a threshold value. The threshold value when resetting this operating schedule was made a fixed value.

SUMMARY OF DISCLOSURE

However, the degree of freedom when resetting the operating schedule tends to become lower the shorter the remaining distance from the current position to the destination. Therefore, even if resetting the operating schedule from when the remaining distance from the current position to the destination becomes shorter, it is not possible to correct the difference occurring with the target amount of charge of the battery in the remaining driving section and the amount of fuel consumption at the point of time of arrival at the destination is liable to become larger than the initially scheduled amount of fuel consumption and the fuel efficiency is liable to deteriorate. That is, even if resetting the operating schedule, it is liable to become impossible to operate the vehicle with a good fuel efficiency efficiently using the charged power of the battery.

The present disclosure was made focusing on such a problem and has as its object to suitably set a condition for resetting the operating schedule to thereby reset the operating schedule to enable operation with a good fuel efficiency efficiently using the charged power of a battery.

To solve this problem, according to one aspect of the present disclosure, there is provided a control device for a hybrid vehicle provided with power sources constituted by an internal combustion engine and rotary electrical machine and with a rechargeable battery, the control device of a hybrid vehicle comprising a projected driving route calculating part calculating a projected driving route up to a destination, a target charged amount setting part setting a target amount of charge of the battery at each point on the projected driving route based on information relating to the projected driving route up to the destination and the amount of charge of the battery at the time of setting the destination, an operating schedule setting part setting an operating schedule of the internal combustion engine and rotary electrical machine so that the amount of charge of the battery at each point on the projected driving route becomes the target amount of charge, and an operating schedule resetting part resetting the operating schedule of the internal combustion engine and rotary electrical machine when a difference between the amount of charge of the battery and the target charged amount at each point on the projected driving route becomes a reset request value or more. The operating schedule resetting part is configured so as to reduce the reset request value when the remaining distance on the projected driving route is short compared to when it is long.

According to this aspect of the present disclosure, it is possible to set the condition for resetting the operating schedule to a suitable condition corresponding to the remaining distance to the destination. For this reason, it is possible to reset the operating schedule so as to operate the vehicle with a good fuel efficiency efficiently using the charged power of the battery.

DESCRIPTION OF EMBODIMENTS

Figure 1:
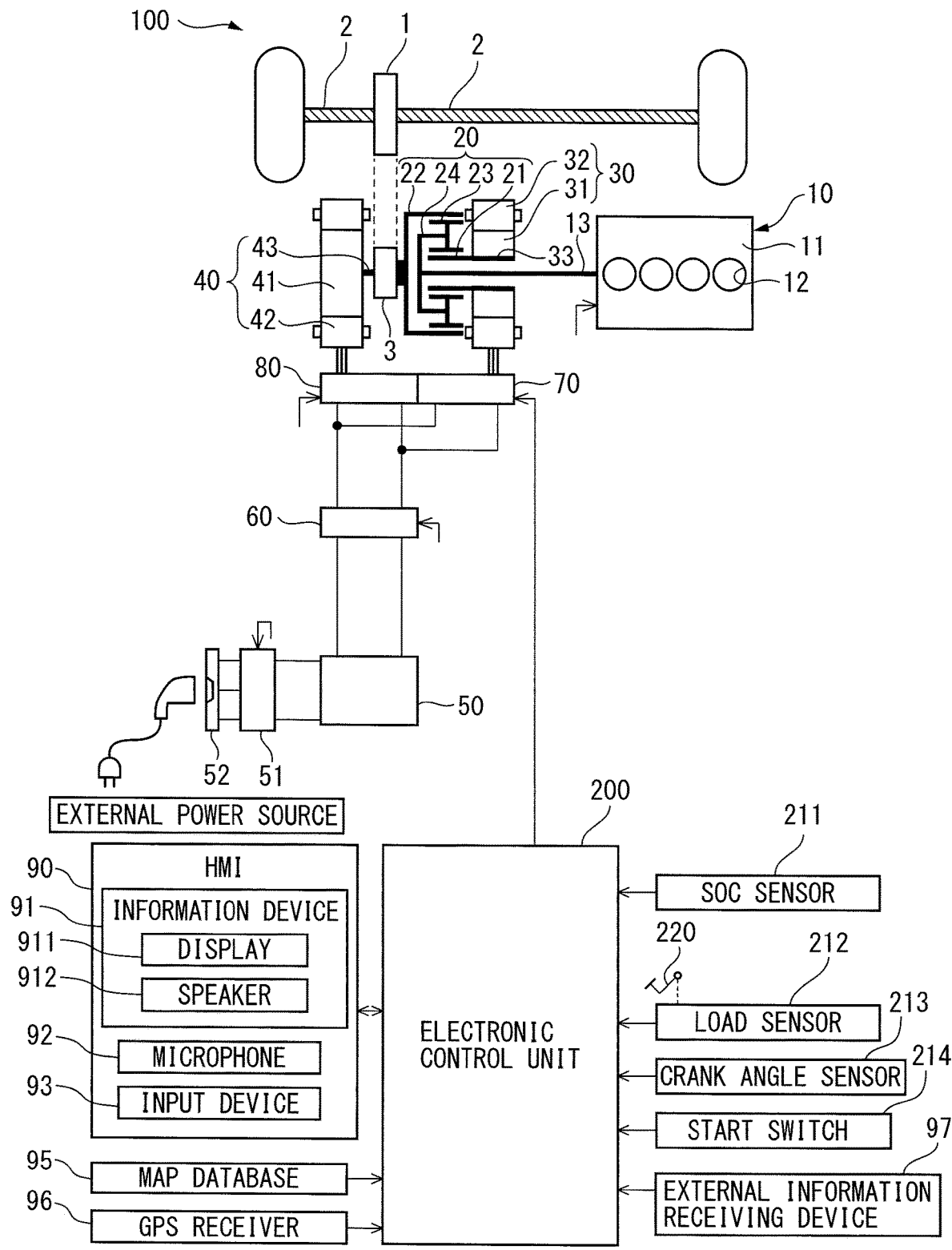
FIG. 1 is a schematic view of the configuration of a vehicle and an electronic control unit for controlling the vehicle according to a first embodiment of the present disclosure.

Below, referring to the drawings, embodiments of the present disclosure will be explained in detail. Note that, in the following explanation, similar components are assigned the same reference numerals.

First Embodiment

FIG. 1 is a schematic view of the configuration of a vehicle 100 and an electronic control unit 200 controlling the vehicle 100 according to a first embodiment of the present disclosure.

The vehicle 100 is provided with an internal combustion engine 10, a power division mechanism 20, a first rotary electrical machine 30, a second rotary electrical machine 40, a battery 50, a boost converter 60, a first inverter 70, a second inverter 80, a human machine interface (below, referred to as an "HMI") 90, a map database 95, a GPS receiver 96, and an external information receiving device 97. The vehicle 100 is a hybrid vehicle configured to be able to transmit the power of one or both of the internal combustion engine 10 and the second rotary electrical machine 40 through a final deceleration device 1 to a wheel drive shaft 2.

The internal combustion engine 10 burns fuel inside cylinders 12 formed in the engine body 11 to generate power for making an output shaft 13 connected to a crankshaft rotate. The internal combustion engine 10 according to the present embodiment is a gasoline engine, but may also be made a diesel engine.

The power division mechanism 20 is a planetary gear for dividing the power of the internal combustion engine 10 into two systems of the power for turning the wheel drive shaft 2 and power for driving the first rotary electrical machine 30 in a regeneration mode and is provided with a sun gear 21, ring gear 22, pinion gears 23, and a planetary carrier 24.

The sun gear 21 is an external gear and is arranged at the center of the power division mechanism 20. The sun gear 21 is connected with a shaft 33 of the first rotary electrical machine 30.

The ring gear 22 is an internal gear and is arranged around the sun gear 21 so as to become concentric with the sun gear 21. The ring gear 22 is connected with a shaft 33 of the second rotary electrical machine 40. Further, the ring gear 22 has integrally attached to it a drive gear 3 for transmitting rotation of the ring gear 22 to the wheel drive shaft 2 through the final deceleration device 1.

A pinion gear 23 is an external gear. A plurality are arranged between the sun gear 21 and ring gear 22 so as to mesh with the sun gear 21 and ring gear 22.

The planetary carrier 24 is connected to the output shaft 13 of the internal combustion engine 10 and rotates about the output shaft 13. Further, the planetary carrier 24 is also connected to the pinion gears 23 so as to enable the pinion gears 23 to revolve (orbit) around the sun gear 21 while individually rotating on their axes when the planetary carrier 24 rotates.

The first rotary electrical machine 30 is, for example, a three-phase AC synchronous type motor-generator and is provided with a rotor 31 attached to the outer circumference of the shaft 33 coupled with the sun gear 21 and having a plurality of permanent magnets embedded in its outer circumference and a stator 32 around which is wound an excitation coil generating a rotating magnetic field. The first rotary electrical machine 30 has the function of a motor receiving the supply of power from the battery 50 and being driven in a power running mode and the function of a generator receiving power from the internal combustion engine 10 and being driven in a regeneration mode.

In the present embodiment, the first rotary electrical machine 30 is mainly used as a generator. Further, when making the output shaft 13 rotate for cranking at the time of startup of the internal combustion engine 10, it is used as a motor and plays the role of a starter.

The second rotary electrical machine 40 is, for example, a three-phase AC synchronous type motor-generator. It is provided with a rotor 41 attached to the outer circumference of the shaft 43 connected to the ring gear 22 and having a plurality of permanent magnets embedded in its outer circumferential part and with a stator 42 around which an excitation coil generating a rotating magnetic field is wound. The second rotary electrical machine 40 has the function as a motor receiving the supply of power from a battery 50 and being driven in a power running mode and the function as a generator receiving power from the wheel drive shaft 2 and being driven in a regeneration mode at the time of deceleration of the vehicle etc.

The battery 50 is, for example, a nickel-cadmium storage battery or nickel-hydrogen storage battery, lithium ion battery, or other rechargeable secondary battery. In the present embodiment, as the battery 50, a lithium ion secondary battery with a rated voltage of 200V or so is used. The battery 50 is electrically connected through a boost converter 60 etc. to the first rotary electrical machine 30 and second rotary electrical machine 40 so as to enable charged power of the battery 50 to be supplied to the first rotary electrical machine 30 and second rotary electrical machine 40 and drive them in the power running mode and, further, so as to enable the generated power of the first rotary electrical machine 30 and second rotary electrical machine 40 to charge the battery 50.

Further, the battery 50 is, for example, configured so as to be able to be electrically connected with a home power outlet or other external power source through a charging control circuit 51 and charging lid 52 so as to be able to be charged from the external power source. The charging control circuit 51 is an electrical circuit able to convert the alternating current supplied from an external power source to a direct current based on a control signal from the electronic control unit 200 and boost the input voltage to the battery voltage to charge the battery 50 with the power of the external power source.

The boost converter 60 is provided with an electrical circuit boosting the terminal voltage of the primary side terminal and outputting it from the secondary side terminal based on a control signal from the electronic control unit 200 and conversely lowering the terminal voltage of the secondary side terminal and outputting it from the primary side terminal based on a control signal from the electronic control unit 200. The primary side terminal of the boost converter 60 is connected to the output terminal of the battery 50, while the secondary side terminal is connected to the DC side terminals of the first inverter 70 and second inverter 80.

The first inverter 70 and second inverter 80 are provided with electrical circuits enabling them to convert direct currents input from the DC side terminals to alternating currents (in the present embodiment, three-phase alternating currents) and output them from the AC side terminals based on a control signal from the electronic control unit 200 and conversely to convert alternating currents input from the AC side terminals to direct currents and output them from the DC side terminals based on a control signal of the electronic control unit 200. The DC side terminal of the first inverter 70 is connected to the secondary side terminal of the boost converter 60, while the AC side terminal of the first inverter 70 is connected to the input/output terminal of the first rotary electrical machine 30. The DC side terminal of the second inverter 80 is connected to the secondary side terminal of the boost converter 60, while the AC side terminal of the second inverter 80 is connected to the input/output terminal of the second rotary electrical machine 40.

The HMI 90 is an interface for input/output of information between the driver or a vehicle passenger and the vehicle 100. The HMI 90 according to the present embodiment is provided with an information device 91 for providing the driver with various types of information, a microphone 92 for recognition of voice of the driver, and an input device 93 such as a touch panel or operating buttons for a driver to perform an input operation. The information device 91 is provided with a display 911 for displaying text information or graphic information and a speaker 912 for generating sound.

The map database 95 is a database relating to map information. This map database 95 is stored in, for example, a hard disk drive (HDD) mounted in the vehicle. The map information includes position information of roads and information of the road shapes (for example, differentiation between a curve and straight line, curvature of a curve, etc.), position information of intersections and forks, types of roads, and other information etc.

The GPS receiver 96 receives signals from three or more GPS satellites to identify the latitude and longitude of the vehicle 100 and detect the current position of the vehicle 100. The GPS receiver 96 sends the current position information of the vehicle 100 detected to the electronic control unit 200.

The external information receiving device 97 receives, for example, congestion information, roadwork information, and other external information sent from a road traffic information communication system center or other external communication center. The external information receiving device 97 sends the received external information to the electronic control unit 200.

The electronic control unit 200 is a microcomputer provided with components connected with each other by a bidirectional bus such as a central processing unit (CPU), read only memory (ROM), random access memory (RAM), input port, and output port.

The electronic control unit 200 receives as input the output signals from various sensors such as an SOC sensor 211 for detecting the amount of charge of the battery SOC, a load sensor 212 generating an output voltage proportional to the amount of depression of the accelerator pedal 220, a crank angle sensor 213 generating an output pulse each time the crankshaft of the engine body 11 rotates by for example 15° as a signal for calculating the engine rotational speed etc., and a start switch 214 for judging starting and stopping of the vehicle 100.

The electronic control unit 200 drives the various controlled parts to control the vehicle 100 based on the input output signals of the various sensors etc. Below, the control of the vehicle 100 according to the present embodiment performed by the electronic control unit 200, in particular the control for switching the driving mode of the vehicle 100, will be explained.

Figure 2:
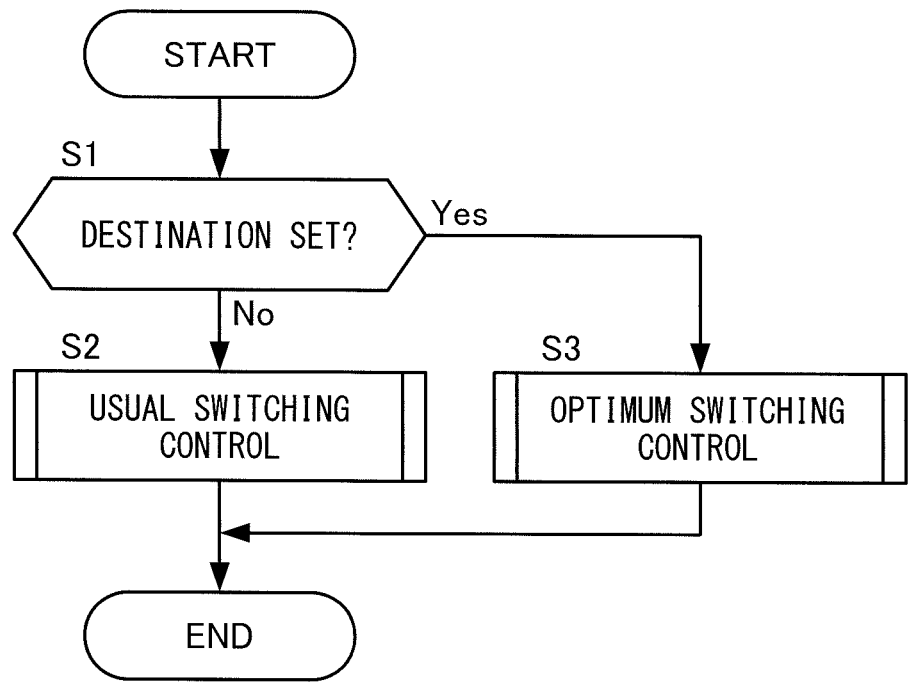
FIG. 2 is a flow chart for explaining driving mode switching control according to the first embodiment of the present disclosure.

FIG. 2 is a flow chart explaining driving mode switching control according to the present embodiment. The electronic control unit 200 repeatedly performs this routine every predetermined processing period during one trip where the vehicle 100 is driven (from when start switch 214 is turned to ON to when it is turned to OFF).

At step S1, the electronic control unit 200 judges if the destination of the vehicle 100 is known. Specifically, the electronic control unit 200 proceeds to the processing of step S2 when the driver has not set the destination through the HMI 90 and the destination is unknown. On the other hand, the electronic control unit 200 proceeds to the processing of step S3 when the driver has set the destination through the HMI 90 and the destination is known.

At step S2, the electronic control unit 200 performs the usual switching control. The usual switching control is control for switching the driving mode performed when the destination is not known. Details of the usual switching control will be explained later while referring to FIG. 3.

At step S3, the electronic control unit 200 performs the optimum switching control. The optimum switching control is control for switching a driving mode performed for the purpose of operating the vehicle with a good fuel efficiency efficiently using the charged power of the battery 50 when the destination is known. Details of the optimum switching control will be explained later while referring to FIG. 4 to FIG. 7.

Figure 3:
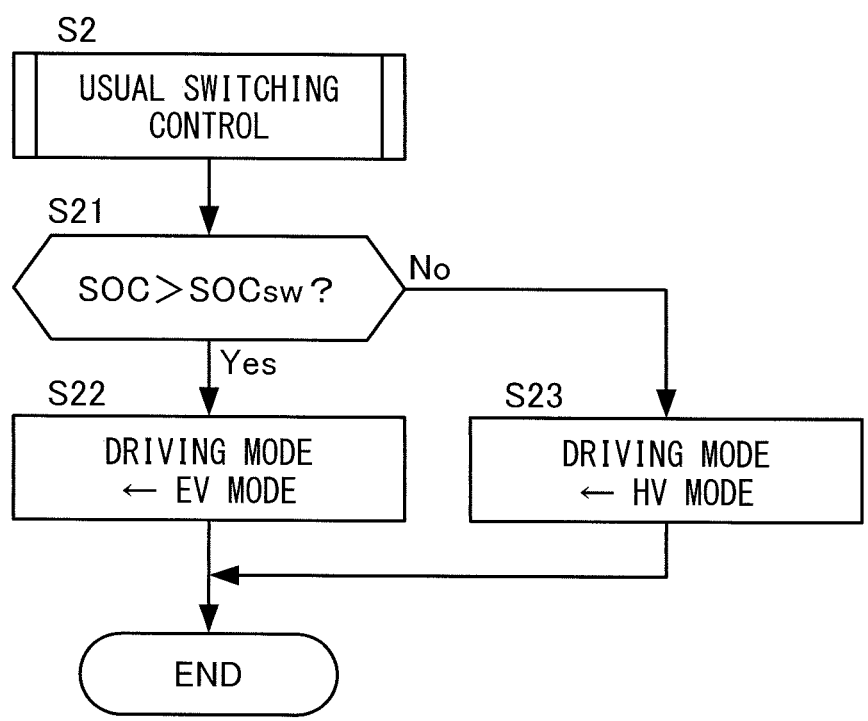
FIG. 3 is a flow chart for explaining usual switching control according to the first embodiment of the present disclosure.

FIG. 3 is a flow chart explaining usual switching control.

At step S21, the electronic control unit 200 judges if the amount of charge SOC of the battery is larger than a predetermined mode switching charged amount (for example, 20% of the fully charged amount) $SOC_{SW}$. The electronic control unit 200 proceeds to the processing of step S22 if the amount of charge SOC of the battery is greater than the mode switching charged amount $SOC_{SW}$ and proceeds to the processing of step S23 if the amount of charge SOC of the battery is the mode switching charged amount $SOC_{SW}$ or less.

At step S22, the electronic control unit 200 sets the driving mode of the vehicle 100 to an EV (electric vehicle) mode. The EV mode is also sometimes referred to as a "CD (charge depleting) mode".

When the driving mode of the vehicle 100 is set to the EV mode, the electronic control unit 200 basically causes the internal combustion engine 10 to stop and in that state uses the charged power of the battery 50 to drive the second rotary electrical machine 40 in the power running mode and use only the power of the second rotary electrical machine 40 to make the wheel drive shaft 2 rotate. Further, the electronic control unit 200 makes the internal combustion engine 10 operate as an exception when a predetermined engine start condition stands and uses the powers of both the internal combustion engine 10 and second rotary electrical machine 40 to make the wheel drive shaft 2 rotate.

The engine start condition during the EV mode is set from the viewpoint of securing the driving performance of the vehicle 100 or protection of the parts. For example, the time when the vehicle speed becomes a predetermined vehicle speed (for example, 100 km/h) or more, the time when the amount of depression of the accelerator increases and the demanded vehicle output set based on the amount of depression of the accelerator and the vehicle speed becomes a predetermined output or more (time of demand of rapid acceleration), the time when the battery temperature becomes a predetermined temperature (for example −10° C.) or less, etc. may be mentioned.

In this way, the EV mode is a mode in which the charged power of the battery 50 is preferentially utilized to drive the second rotary electrical machine 40 in the power running mode and transfer at least the power of the second rotary electrical machine 40 to the wheel drive shaft 2 to operate the vehicle 100.

At step S23, the electronic control unit 200 sets the driving mode of the vehicle 100 to the HV (hybrid vehicle) mode. The HV mode is sometimes also called the "CS (charge sustaining) mode".

When the driving mode of the vehicle 100 is set to the HV mode, the electronic control unit 200 divides the power of the internal combustion engine 10 into two systems by the power division mechanism 20, transmits one system of the power of the internal combustion engine 10 to the wheel drive shaft 2, and uses the other system of the power to drive the first rotary electrical machine 30 in the regeneration mode. Further, basically it uses the generated power of the first rotary electrical machine 30 to drive the second rotary electrical machine 40 in the power running mode, and transmits the power of the second rotary electrical machine 40 to the wheel drive shaft 2 in addition to the system of the power of the internal combustion engine 10. Exceptionally, when, for example, the amount of depression of the accelerator increases and the demanded vehicle output becomes a predetermined output or more etc., to secure the driving performance of the vehicle 100, the generated power of the first rotary electrical machine 30 and the charged power of the battery 50 are used to drive the second rotary electrical machine 40 in the power running mode and the powers of both the internal combustion engine 10 and second rotary electrical machine 40 are transmitted to the wheel drive shaft 2.

In this way, the HV mode is the mode when operating the internal combustion engine 10 and preferentially utilizing the generated power of the first rotary electrical machine 30 to drive the second rotary electrical machine 40 in the power running mode and transmitting the powers of both of the internal combustion engine 10 and second rotary electrical machine 40 to the wheel drive shaft 2 to drive the vehicle 100.

Next, referring to FIG. 4 to FIG. 7, optimum switching control according to the present embodiment will be explained.

The internal combustion engine 10 tends to become poorer in heat efficiency the lower the engine load. Therefore, to improve the fuel efficiency, for example, in a driving section with a large number of traffic lights, a driving section with a large amount of traffic and easy occurrence of congestion, and other driving sections where vehicles frequently repeatedly start and stop or are driven at a low speed (below, referred to as "low load driving sections"), it is preferable to switch the driving mode to the EV mode to drive the vehicle 100.

Further, in a driving section enabling steady driving while maintaining a certain constant vehicle speed or more and other driving sections over which the vehicle can be run in engine load region with a good heat efficiency (below, referred to as "steady driving sections"), it is preferable to switch the driving mode to the HV mode to drive the vehicle 100.

Therefore, when the destination of the vehicle 100 is known, it is preferable to calculate the projected driving route up to the destination, set the operating schedule of the internal combustion engine 10 and second rotary electrical machine 40 in advance so as to enable the driving mode to be switched to the EV mode in the low load driving sections on the projected driving route and the driving mode to be switched to the HV mode in the steady driving sections, and control the amount of charge of the battery. That is, it is desirable to judge in which driving sections on the projected driving route the charged power of the battery 50 should be used to drive the vehicle 100 so as to reach the destination most efficiently and switch the driving mode based on the result of judgment.

Therefore, in the present embodiment, when the destination of the vehicle 100 is known, an operating schedule of the internal combustion engine 10 and second rotary electrical machine enabling the driving mode to be switched to the EV mode in the low load driving sections on the projected driving route and the driving mode to be switched to the HV mode in the steady driving sections is set at the time of setting and resetting the destination. Further, the internal combustion engine 10 and second rotary electrical machine are controlled in accordance with the set operating schedule to control the amount of charge of the battery.

Figure 4:
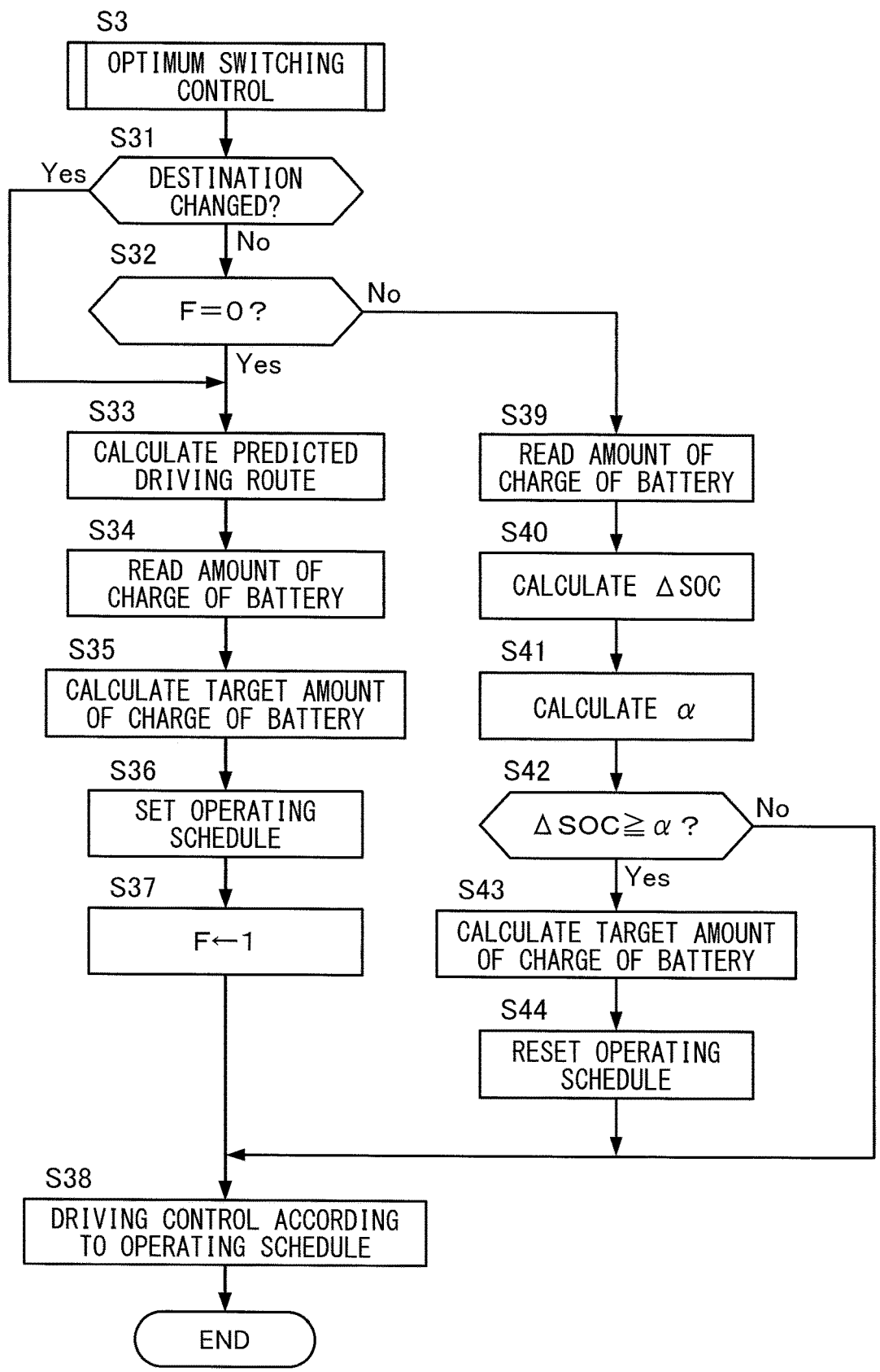
FIG. 4 is a flow chart for explaining optimum switching control according to the first embodiment of the present disclosure.

FIG. 4 is a flow chart explaining the optimum switching control according to the present embodiment.

At step S31, the electronic control unit 200 judges if the destination has been changed. The electronic control unit 200 judges that the destination has been changed and proceeds to the processing of step S33 if the destination in the previous processing and the destination in the current processing differ. On the other hand, the electronic control unit 200 proceeds to the processing of step S32 if the destination in the previous processing and the destination in the current processing are the same.

At step S32, the electronic control unit 200 judges if the flag F has been set to "0". The flag F is a flag which is set to "1" when the destination is set and the operating schedule of the internal combustion engine 10 and second rotary electrical machine 40 is set and is returned to "0" when the start switch 214 is turned to OFF. The initial value is set to "0". The electronic control unit 200 proceeds to the processing of step S33 if the flag F is set to "0". On the other hand, the electronic control unit 200 proceeds to the processing of step S39 if the flag F is set to "1".

At step S33, the electronic control unit 200 calculates the projected driving route of the vehicle up to the destination. Specifically, the electronic control unit 200 calculates the projected driving route up to the destination based on the map information of the map database 95 and the current position information of the vehicle 100 detected by the GPS receiver 96.

At step S34, the electronic control unit 200 reads the amount of charge of the battery detected by the SOC sensor 211. Note that, the unit proceeds to the processing of step S34 when the destination is first set and when the destination is changed, so the amount of charge of the battery read at step S34 is the amount of charge of the battery at the time of setting or changing the destination.

At step S35, the electronic control unit 200 sets the target amount of charge of the battery at each point on the projected driving route based on information relating to the projected driving route and the current amount of charge of the battery read at step S34. That is, the electronic control unit 200 determines how to consume the amount of charge of the battery at the time of setting or charging the destination in the projected driving route to drive the vehicle 100 so as to be able to switch the driving mode to the EV mode in the low load driving sections on the projected driving route.

Note that as the information relating to the projected driving route, for example, there is current and past information relating to the projected driving route. As the current information relating to the projected driving route, for example, the congestion information and roadwork information on the projected driving route received by the external information receiving device 97, the positions of traffic lights on the projected driving route and road types (general roads, trunk roads, inter-city highways, city highways, etc.) stored in the map database 95, and other information may be mentioned.

Further, as the past information relating to the projected driving route, the vehicle speed, day, time of day, and other information when driving over the projected driving route in the past may be mentioned. In the present embodiment, to utilize such past information on the projected driving route, information such as the actual driving route, vehicle speed, day, and time of day during one trip are separately analyzed and stored in the electronic control unit 200.

At step S36, the electronic control unit 200 sets the operating schedule of the internal combustion engine 10 and second rotary electrical machine 40 so that the amount of charge of the battery at each point on the projected driving route becomes the target amount of charge of the battery. That is, the electronic control unit 200 determines the sections over which the vehicle is driven in the EV mode and the sections over which the vehicle is driven in the HV mode so that the amount of charge of the battery at each point on the projected driving route becomes the target amount of charge of the battery.

At step S37, the electronic control unit 200 sets the flag F at "1".

At step S38, the electronic control unit 200 performs control for switching the driving mode according to the operating schedule to control the internal combustion engine 10 and second rotary electrical machine 40.

In this way, when the driver sets or changes the destination and the routine proceeds to the processing of step S33 and on, the optimum operating schedule from the point at which the operation of setting or changing destination is performed (current position) to the destination is set.

However, the road conditions on the projected driving route change with each instant. Further, the way the driver operates the vehicle when driving along the projected driving route also does not always match the way the driver operated it in the past. For this reason, when actually running along the projected driving route, deviation sometimes occurs between the amount of charge of the battery detected at each point on the projected driving route and the target amount of charge of the battery.

If switching the driving mode according to the operating schedule set when setting or charging the destination while allowing this deviation to remain, sometimes the vehicle will reach the destination in a state with the actual amount of charge of the battery greater than the initially scheduled target amount of charge of the battery at the destination. In this case, as a result, regardless of the fact that there is an extra margin in the amount of charge of the battery, the vehicle is not driven in the EV mode but is driven in the HV mode, so the fuel efficiency deteriorates compared with that initially scheduled.

Further, conversely, sometimes, the amount of charge of the battery ends up falling to the initially scheduled target amount of charge of the battery at the destination before reaching the destination. The target amount of charge of the battery at the destination is basically set to zero or, from the viewpoint of battery protection etc., is set to a lower limit value below which the amount of charge is not preferably lowered. Therefore, after the amount of charge of the battery falls to the target amount of charge of the battery at the destination, the vehicle is run in the HV mode. For this reason, if there is a large low load driving section in the driving section after the amount of charge of the battery falls to the target amount of charge of the battery, the fuel efficiency deteriorates.

Therefore, in the present embodiment, when the operating schedule is set once and the later explained processing of step S39 and on is proceeded to, the operating schedule is reset when the deviation $\Delta SOC$ between the actually detected amount of charge of the battery at each point on the projected driving route and the target amount of charge of the battery (below, referred to as the "charge deviation") becomes the reset request value $\alpha$ or more.

Further, in the present embodiment, further, the reset request value $\alpha$ is not a fixed value, but is made a variable value changing according to the remaining distance L to the destination. Specifically, the shorter the remaining distance L to the destination, the smaller the reset request value $\alpha$ is made.

Below, referring to FIG. 5 and FIG. 6, the problem occurring when making the reset request value $\alpha$ a fixed value will be explained with reference to the example where the actual value of the amount of charge of the battery (actual amount of charge of the battery) becomes greater than the target amount of charge of the battery by exactly the reset request value $\alpha$ and the operating schedule is reset.

Figure 5:
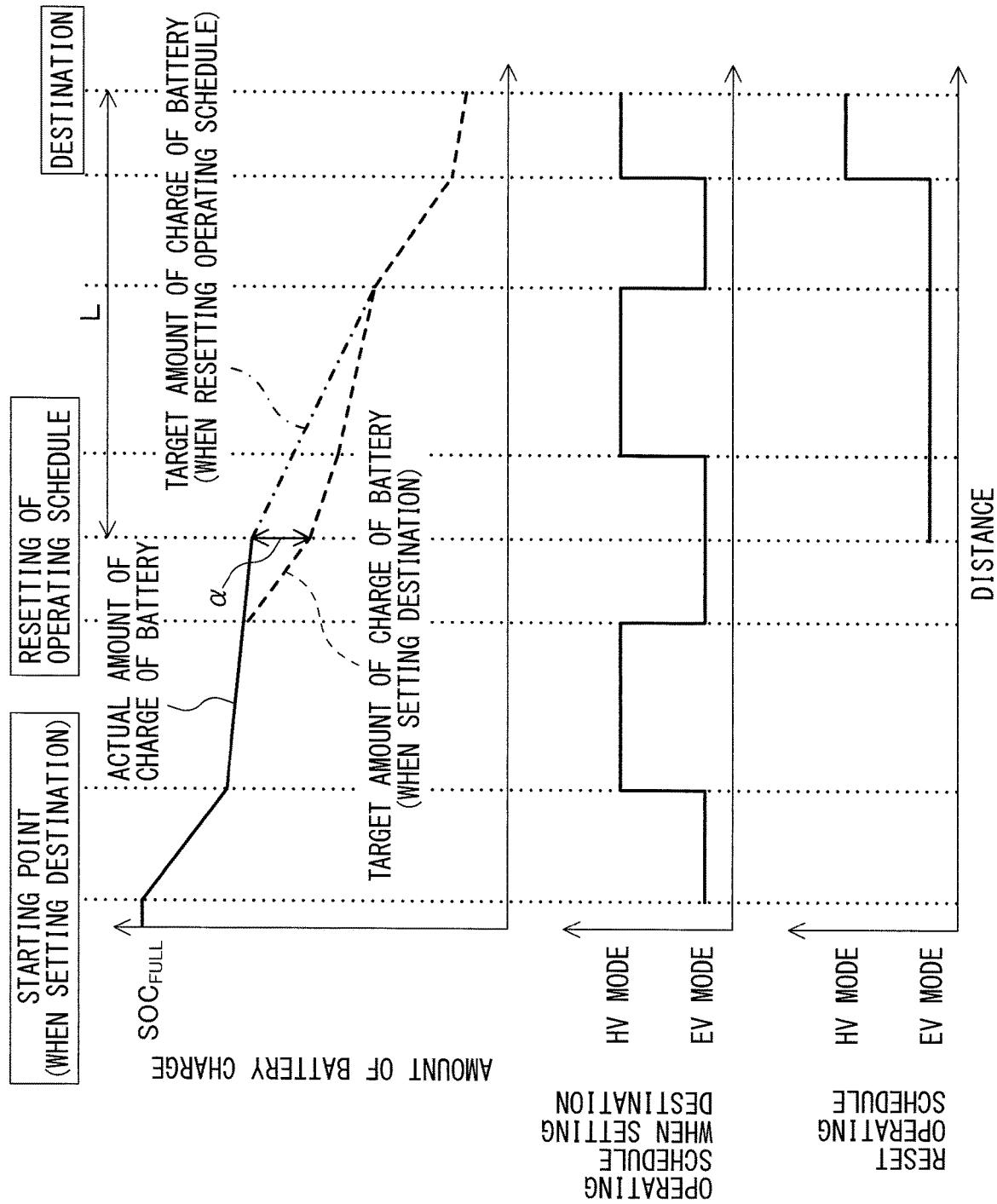
FIG. 5 is a view explaining a problem occurring when making a reset request value a fixed value and a view showing the situation when the operating schedule is reset in a stage where the remaining distance L to the destination is relatively long.

FIG. 5 is a view showing the situation when the operating schedule is reset at the stage where the remaining distance L to the destination is relatively long. On the other hand, FIG. 6 is a view showing the situation when the operating schedule is reset at the stage where the remaining distance L to the destination is relatively short.

As shown in FIG. 5, if the actual amount of charge of the battery becomes greater than the target amount of charge of the battery by exactly the reset request value $\alpha$ at the stage where the remaining distance L to the destination is relatively long, the degree of freedom when resetting the operating schedule is higher by exactly the longer part of the remaining distance L to the destination. That is, the degree of freedom of the enlargement and reduction (amount of correction) of the set sections of the drive modes of the EV mode and HV mode set when setting the destination is high. For this reason, by resetting the operating schedule, it is possible to use up the amount of charge of the battery remaining in excess over the initial target (that is, amount of charge of the battery of amount of reset request value $\alpha$) in the remaining driving section.

Figure 6:
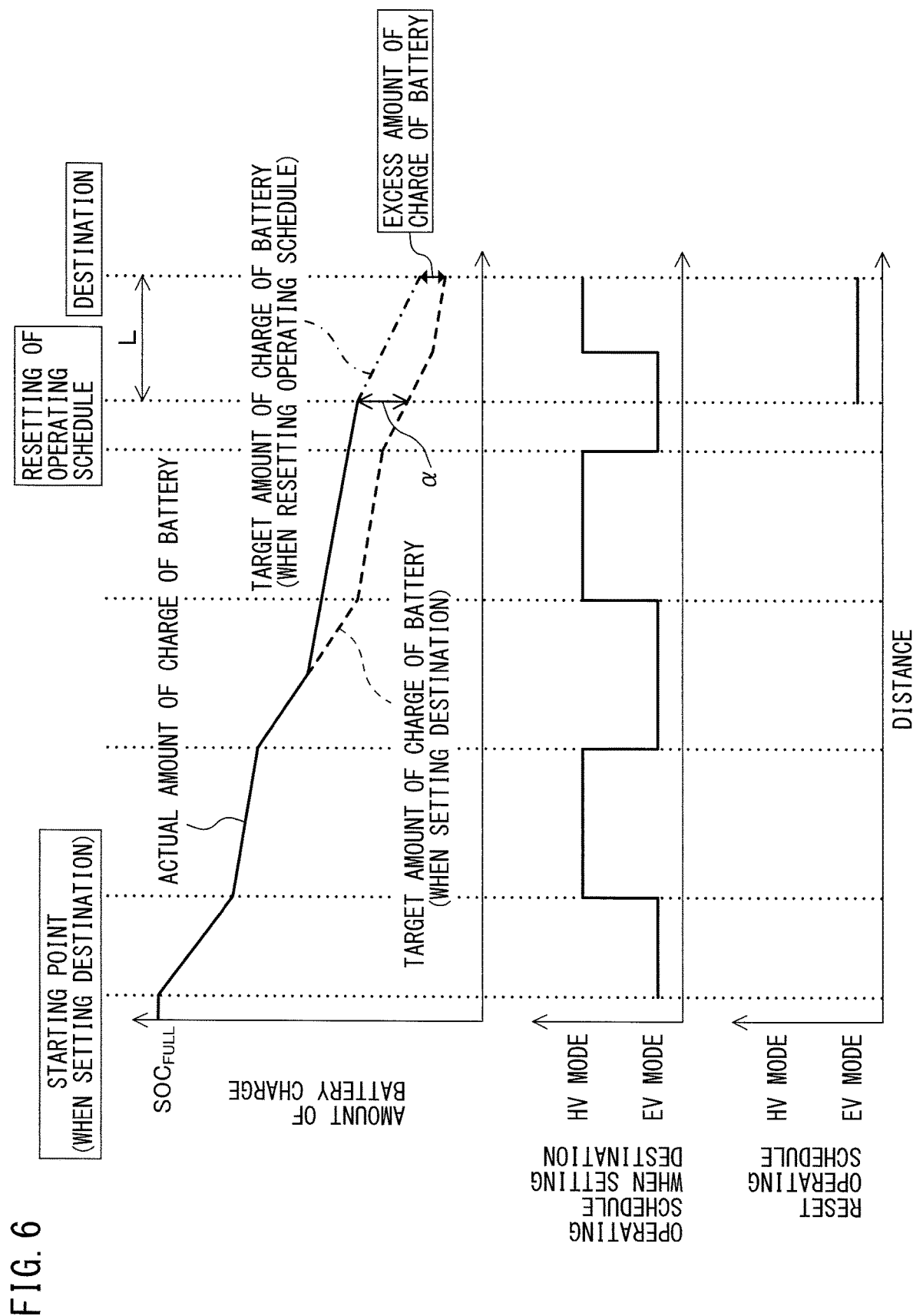
FIG. 6 is a view explaining a problem occurring when making a reset request value a fixed value and a view showing the situation when the operating schedule is reset in a stage where the remaining distance L to the destination is relatively short.

On the other hand, as shown in FIG. 6, if the actual amount of charge of the battery becomes greater than the target amount of charge of the battery by exactly the reset request value $\alpha$ at the stage where the remaining distance L to the destination is relatively short, since the remaining distance L to the destination is short, the degree of freedom when resetting the operating schedule is low. For this reason, even if resetting the operating schedule, sometimes it is not possible to use up the amount of charge of the battery remaining in excess over the initial target (that is, amount of charge of the battery of amount of reset request value $\alpha$) in the remaining driving section. As a result, even if resetting the operating schedule, it is not possible to correct the deviation occurring between the actually detected amount of charge of the battery at each point on the projected driving route and the target amount of charge of the battery before reaching the destination and the fuel efficiency deteriorates over that initially scheduled.

In this way, the degree of freedom when resetting the operating schedule changes in accordance with the remaining distance L to the destination. For this reason, if making the reset request value $\alpha$ a fixed value, the shorter the remaining distance L to the destination, the smaller the effect when resetting the operating schedule.

Therefore, in the present embodiment, the shorter the remaining distance L to the destination, the smaller the reset request value α is made to become. Due to this, before the remaining distance L to the destination becomes shorter and the degree of freedom when resetting the operating schedule falls, it is possible to reset the operating schedule. That is, when the remaining distance L to the destination becomes short, compared to when the remaining distance L to the destination is long, it is possible to quickly correct the deviation occurring between the actually detected amount of charge of the battery at each point on the projected driving route and the target amount of charge of the battery. For this reason, even when resetting the operating schedule at the stage where the remaining distance L to the destination becomes short, it is possible to obtain the effect of improvement of the fuel efficiency due to resetting the operating schedule.

Below, returning to FIG. 4, the processing at step S39 on will be explained.

At step S39, the electronic control unit 200 reads the amount of charge of the battery detected by the SOC sensor 211. The amount of charge of the battery read at step S39 is the actually detected amount of charge of the battery at each point on the projected driving route.

At step S40, the electronic control unit 200 calculates the charge deviation ΔSOC. Specifically, the electronic control unit 200 calculates the absolute value of the amount of charge of the battery read at step S39 minus the target amount of charge of the battery at the current position as the charge deviation ΔSOC.

Figure 7:
FIG. 7 is a table for calculating the reset request value based on the remaining distance to the destination.

At step S41, the electronic control unit 200 calculates the reset request value α based on the remaining distance L to the destination by referring to the table of FIG. 7. As shown in the table of FIG. 7, the reset request value α becomes smaller when the remaining distance to the destination is short compared to when it is long.

At step S42, the electronic control unit 200 judges if the charge deviation ΔSOC is the reset request value α or more. The electronic control unit 200 proceeds to the processing of step S43 if the charge deviation ΔSOC becomes the reset request value α or more. On the other hand, the electronic control unit 200 proceeds to the processing of step S38 if the charge deviation ΔSOC is less than the reset request value α.

At step S43, the electronic control unit 200 resets the target amount of charge of the battery at each point on the projected driving route based on the current and past information relating to the remaining projected driving route and the amount of charge of the battery read at step S39 (that is, amount of charge of the battery when the charge deviation ΔSOC becomes the reset request value α or more).

At step S44, the electronic control unit 200 resets the operating schedule of the internal combustion engine 10 and second rotary electrical machine 40 so that the amount of charge of the battery at each point on the projected driving route becomes the target amount of charge of the battery.

According to the embodiment explained above, there is provided an electronic control unit 200 (control device) for a vehicle 100 (hybrid vehicle) provided with power sources constituted by an internal combustion engine 10 and second rotary electrical machine 40 (rotary electrical machine) and with a rechargeable battery 50, the unit comprising a projected driving route calculating part calculating a projected driving route to a destination, a target charge amount setting part setting a target amount of charge of the battery at each point on the projected driving route based on information regarding the projected driving route to the destination and the amount of charge of the battery at the time of setting the destination, an operating schedule setting part setting an operating schedule of the internal combustion engine 10 and second rotary electrical machine 40 so that the amount of charge of the battery at each point on the projected driving route becomes the target amount of charge of the battery, and an operating schedule resetting part resetting the operating schedule of the internal combustion engine 10 and second rotary electrical machine 40 when the charge deviation ΔSOC between the amount of charge of the battery at each point on the projected driving route and the target amount of charge of the battery becomes a reset request value α or more.

Further, the operating schedule resetting part is configured to make the reset request value α smaller when the remaining distance L of the projected driving route is short compared to when it is long.

Due to this, before the remaining distance L to the destination becomes shorter and the degree of freedom when resetting the operating schedule falls, it is possible to reset the operating schedule. Therefore, when the remaining distance L to the destination becomes short, compared to when the remaining distance L to the destination is long, it is possible to quickly correct deviation occurring between the actually detected amount of charge of the battery at each point on the projected driving route and the target amount of charge of the battery. For this reason, even if resetting the operating schedule at the stage where the remaining distance L to the destination becomes short, it is possible to obtain the effect of improvement of the fuel efficiency by resetting the operating schedule. That is, by resetting the operating schedule, it is possible to drive a vehicle with a good fuel efficiency efficiently using the charged power of the battery 50.

Second Embodiment

Next, a second embodiment of the present disclosure will be explained. The present embodiment differs from the first embodiment on the point of changing the value of the reset request value based on the remaining distance L to the destination and the predicted number of times N of stopping the vehicle 100 in the remaining driving section up to the destination. Below, this point of difference will be focused on in the explanation.

In the above-mentioned first embodiment, the shorter the remaining distance L to the destination, the lower the degree of freedom when resetting the operating schedule, so the reset request value α was made to become lower the shorter the remaining distance L to the destination.

Figure 8:
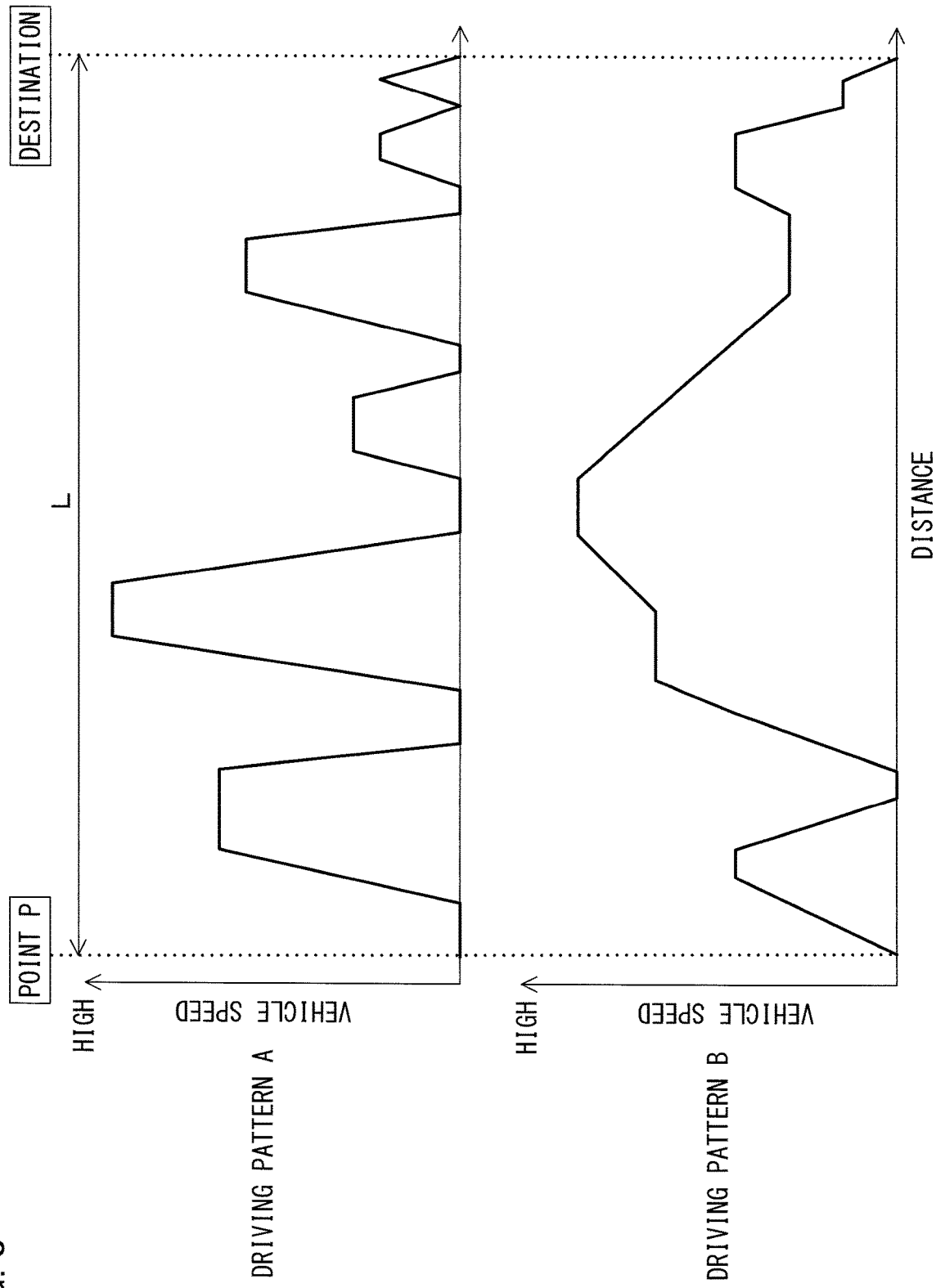
FIG. 8 is a view showing in comparison a driving pattern A with a large predicted number of stopping of a vehicle in a driving section from a certain point P to a destination and a driving pattern B with a small number.

Here, even if the remaining distance L to the destination is the same, the degree of freedom when resetting the operating schedule changes according to the predicted number of times N of stopping the vehicle 100 at the remaining driving section up to the destination. FIG. 8 shows driving patterns in the driving section on the driving route from a certain point P to the destination estimated from the information relating to the projected driving route (for example, congestion information, traffic light position information, and past vehicle speed information) (below, referred to as the "predicted driving pattern") and shows in comparison a driving pattern A with a large predicted number of times N of stopping from a certain point P to the destination and a driving pattern B with a small number.

Here, if resetting the operating schedule at the point P, if the predicted number of times N of stopping the vehicle 100 at the remaining driving section up to the destination is large like with the driving pattern A, that is, if the number of times of acceleration from stopping is large, basically the operating schedule is set so as to enable the driving mode to be switched to the EV mode at the time of acceleration from a stop, so the number of options relating to what sections of the remaining driving section in which the driving mode is switched to the EV mode or HV mode becomes greater.

Therefore, the degree of freedom increases when changing the set sections of the driving modes of the EV mode and HV mode set at the time of setting the destination or when correcting it to become greater or smaller. For this reason, it is possible to correct the deviation between the amount of charge of the battery and target amount of charge of the battery occurring at the point of time of the point P relatively easily by resetting the operating schedule.

On the other hand, if the predicted number of times N of stopping the vehicle 100 in the remaining driving section up to the destination is small like in the driving pattern B, the number of options relating to in what sections of the remaining driving section the driving mode is switched to the EV mode or HV mode becomes smaller.

Therefore, the degree of freedom when changing the set sections of the different driving modes of the EV mode and HV mode set at the time of setting the destination or enlarging or reducing them to correct them becomes lower. For this reason, even if resetting the operating schedule, it becomes difficult to correct the deviation between the amount of charge of the battery and target amount of charge of the battery occurring at the point of time of the point P.

Therefore, if the predicted number of times N of stopping the vehicle 100 at the remaining driving section up to the destination is small, it is desirable to be enable quick correction of deviation occurring between the amount of charge of the battery and target amount of charge of the battery.

Therefore, in the present embodiment, the reset request value α was made smaller the shorter the remaining distance L to the destination and, further, the smaller the predicted number of times N of stopping the vehicle 100 in the remaining driving section up to the destination. Below, the optimum switching control according to the present embodiment will be explained.

Figure 9:
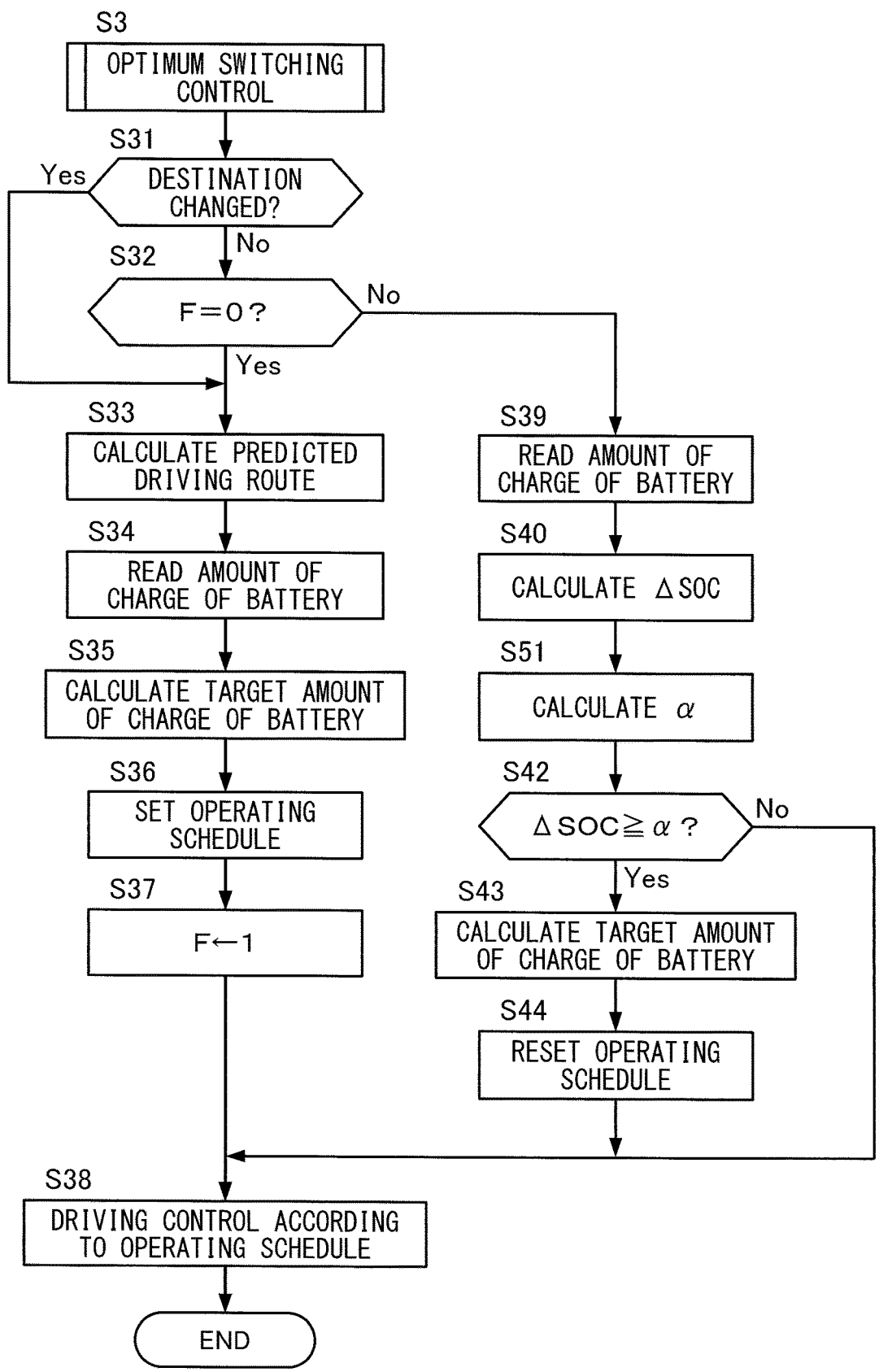
FIG. 9 is a flow chart for explaining optimum switching control according to a second embodiment of the present disclosure.

FIG. 9 is a flow chart explaining the optimum switching control according to the present embodiment. In the flow chart of FIG. 9, the processings from step S31 to step S40 and from step S42 to step S44 perform processings similar to the first embodiment, so here the explanation will be omitted.

Figure 10:
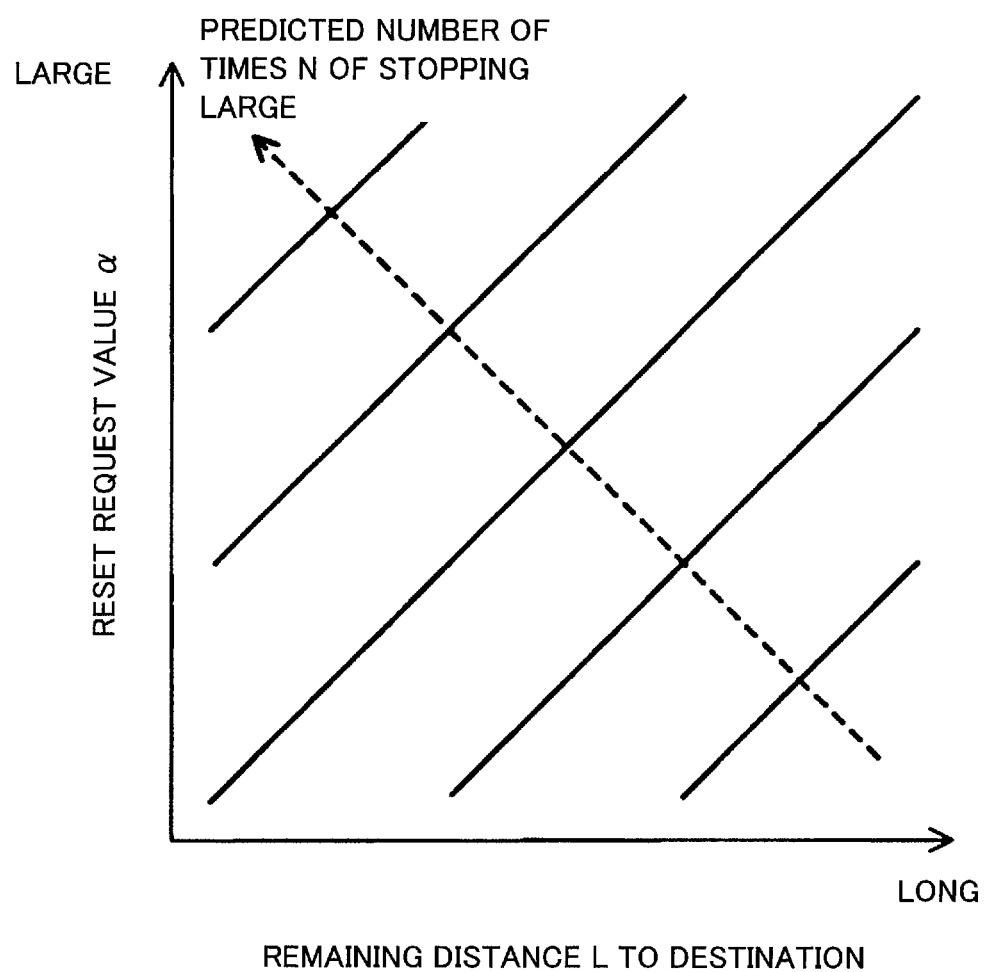
FIG. 10 is a map for calculating a reset request value based on a remaining distance to a destination and a predicted number of times of stopping in a remaining driving section to a destination.

At step S51, the electronic control unit 200 refers to the map of FIG. 10 and calculates the reset request value α based on the remaining distance L to the destination and the predicted number of times N of stopping the vehicle 100 in the remaining driving section up to the destination. Note that the predicted number of times N of stopping in a driving section on the projected driving route can be calculated from the current road information relating to the projected driving route (for example, information of traffic light positions etc.), past vehicle speed information, etc.

As shown in the map of FIG. 10, if the remaining distance L to the destination is the same, the reset request value α is made to become smaller when the predicted number of times N of stopping is small compared to when it is large. That is, the reset request value α basically becomes smaller the shorter the remaining distance L to the destination and, further, the smaller the predicted number of times N of stopping the vehicle 100 in the remaining driving section up to the destination.

According to the present embodiment explained above, the electronic control unit 200 (control device) of the vehicle 100 (hybrid vehicle), like in the first embodiment, is provided with a projected driving route calculating part, a target charge amount calculating part, an operating schedule setting part, and an operating schedule resetting part. Further, the operating schedule resetting part is further configured so as to reduce the reset request value α when the predicted number of times N of stopping in the remaining driving section of the projected driving route is small compared with when it is large.

Due to this, in addition to effects similar to the first embodiment being obtained, it is possible to reset the operating schedule before the predicted number of times N of stopping in the remaining driving section of the projected driving route becomes smaller and the degree of freedom when resetting the operating schedule falls. Therefore, when the predicted number of times N of stopping until the destination becomes small, compared to when the predicted number of times N of stopping until the destination is large, it is possible to quickly correct the deviation occurring between the actually detected amount of charge of the battery at each point on the projected driving route and the target amount of charge of the battery. For this reason, it is possible to obtain an effect of improvement of the fuel efficiency due to resetting the operating schedule even if the predicted number of times N of stopping up to the destination is small and possible to operate the vehicle with a good fuel efficiency efficiently using the charged power of the battery 50 by resetting the operating schedule.

Third Embodiment

Next, a third embodiment of the present disclosure will be explained. The present embodiment differs from the first embodiment on the point of resetting the operating schedule also when deviation occurs between the actual driving pattern in the nearest predetermined driving section and the predicted driving pattern. Below, this point of difference will be focused on in the explanation.

In the above-mentioned embodiments, the operating schedule was reset when the charge deviation ΔSOC became the reset request value α or more. As opposed to this, in the present embodiment, the operating schedule is reset also when deviation occurs between the actual driving pattern in the nearest predetermined driving section and the predicted driving pattern. If, in this way, it is made possible to reset the operating schedule at the point of time when deviation occurs between the actual driving pattern in the nearest predetermined driving section and the predicted driving pattern, it is possible to quickly correct the deviation between the amount of charge of the battery and target amount of charge of the battery. Below, the optimum switching control according to the present embodiment will be explained.

Figure 11:
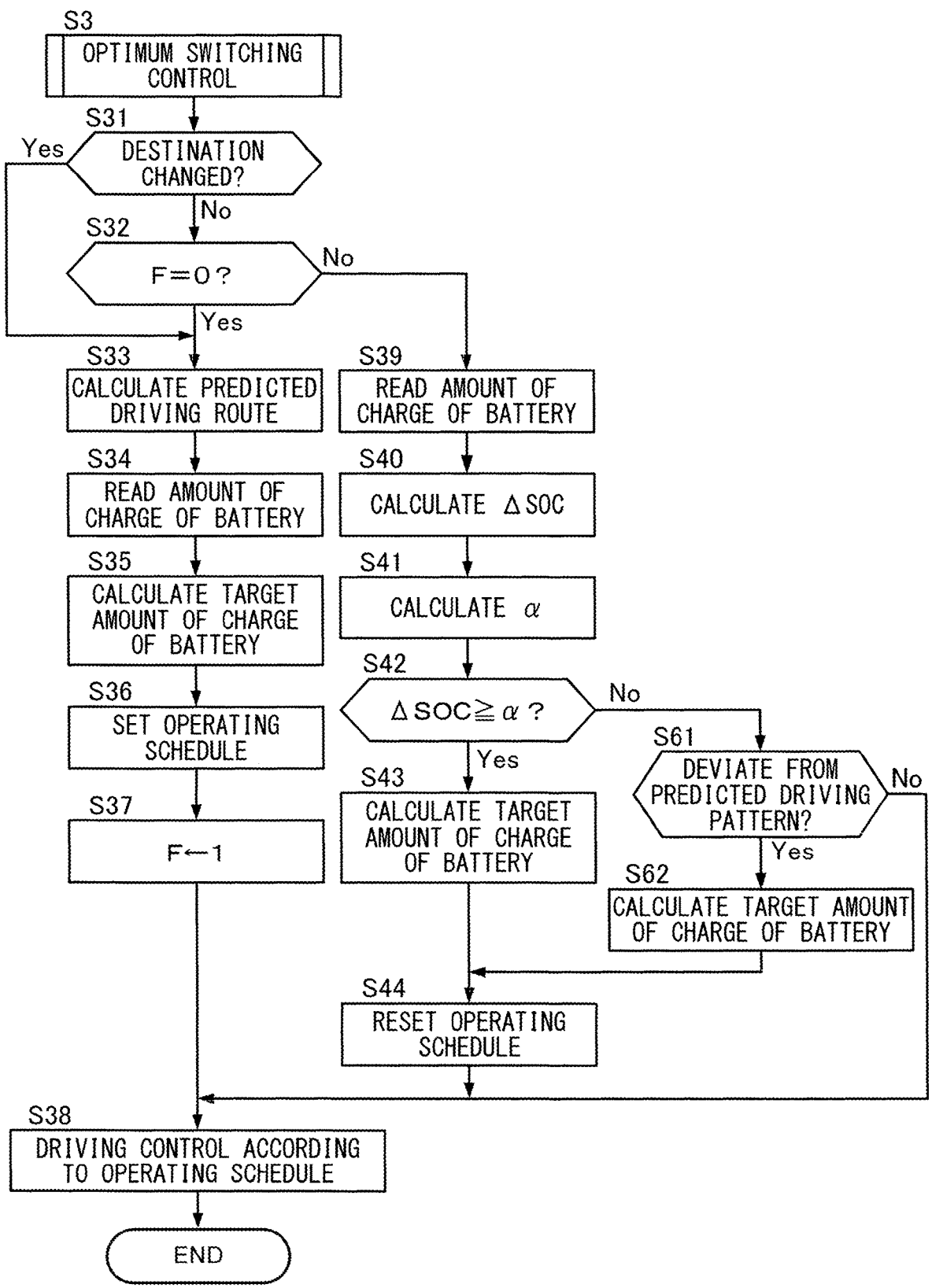
FIG. 11 is a flow chart for explaining optimum switching control according to a third embodiment of the present disclosure.

FIG. 11 is a flow chart explaining the optimum switching control according to the present embodiment. In the flow chart of FIG. 11, the processing from step S31 to step S44 performs processing similar to the first embodiment, so here the explanation will be omitted.

At step S61, the electronic control unit 200 compares the actual driving pattern in the nearest driving section with the predicted driving pattern and judges if deviation has occurred between the actual driving pattern and predicted driving pattern. The electronic control unit 200 proceeds to the processing of step S62 if deviation occurs between the actual driving pattern and the predicted driving pattern. On the other hand, the electronic control unit 200 proceeds to the processing of step S38 if no deviation occurs between the actual driving pattern and predicted driving pattern.

Note that, whether deviation has occurred between the actual driving pattern and predicted driving pattern can for example be judged as follows:

That is, if despite it having been predicted in the predicted driving pattern that the vehicle 100 would be made to stop in a predetermined driving pattern in the section from the nearest time of starting the vehicle to the time of stopping it, that is, that the vehicle 100 would be made to stop due to a traffic light etc. in the predicted driving pattern, the vehicle 100 was not made to stop in the actual driving pattern, it is possible to judge that deviation has occurred between the actual driving pattern and predicted driving pattern.

Further, conversely, it is possible to judge that deviation has occurred between the actual driving pattern and predicted driving pattern also when the vehicle 100 was made to stop in the actual driving pattern despite it having been predicted in the predicted driving pattern that the vehicle 100 would pass without being stopped.

Further, it is also possible to judge that deviation has occurred between the actual driving pattern and predicted driving pattern also when the difference between the average vehicle speed of the predicted driving pattern in the nearest predetermined driving pattern and the average vehicle speed of the actual driving pattern is a predetermined value or more.

At step S62, the electronic control unit 200 resets the target amount of charge of the battery at each point on the projected driving route based on the current and past information relating to the remaining projected driving route and the amount of charge of the battery read at step S39 (that is, the amount of charge of the battery when deviation occurs between the actual driving pattern and predicted driving pattern).

According to the present embodiment explained above, the electronic control unit 200 (control device) of the vehicle 100 (hybrid vehicle), like in the first embodiment, is comprised of a projected driving route calculating part, a target charge amount calculating part, an operating schedule setting part, and an operating schedule resetting part. Further, the operating schedule resetting part is further configured so as to reset the operating schedule of the internal combustion engine and rotary electrical machine also when deviation has occurred between the actual driving pattern in the nearest predetermined driving section (for example, driving section from when vehicle is made to start to when it is made to stop) and the predicted driving pattern in the driving section estimated from information relating to the projected driving route.

Due to this, it is possible to increase the frequency of resetting the operating schedule to quickly correct deviation between the amount of charge of the battery and the target amount of charge of the battery before the charge deviation $\Delta SOC$ becomes the reset request value $\alpha$ or more. For this reason, by controlling the internal combustion engine 10 and second rotary electrical machine 40 in accordance with the operating schedule, it is possible to more reliably drive the vehicle with a good fuel efficiency efficiently utilizing the charged power of the battery 50.

Above, embodiments of the present disclosure were explained, but the embodiments only show some of the examples of application of the present disclosure and are not meant to limit the technical scope of the present disclosure to the specific constitutions of the above embodiments.

For example, in the above embodiments, the optimum switching control was performed when the destination was known, but even when the destination is not known, for example, it is possible to perform the optimum switching control when it is possible to estimate the destination from the time of startup of the vehicle, the day, and other past driving history information.

The invention claimed is:

1. A control device for a hybrid vehicle provided with power sources constituted by an internal combustion engine and rotary electrical machine and with
   a rechargeable battery,
   the control device for a hybrid vehicle comprising:
      a memory storing instructions; and
      a processor configured to execute the instructions to:
         calculate a projected driving route up to a destination;
         set a target amount of charge of the battery at each point on the projected driving route based on information relating to the projected driving route up to the destination and the amount of charge of the battery at the time of setting the destination;
         set an operating schedule of the internal combustion engine and rotary electrical machine so that the amount of charge of the battery at each point on the projected driving route becomes the target amount of charge;
         reset the operating schedule of the internal combustion engine and rotary electrical machine when a difference between the amount of charge of the battery and the target amount of charge at each point on the projected driving route becomes a reset request value or more; and
         adjust the reset request value such that: as a remaining distance from a current position to the destination on the projected driving route becomes shorter, the reset request value is reduced, and as the predicted number of times of stopping becomes smaller, the reset request value is reduced,
      wherein the reset request value is a variable value that is calculated based on the remaining distance from the current position to the destination and a predicted number of times of stopping the hybrid vehicle in a remaining driving section up to the destination.

2. The control device for a hybrid vehicle according to claim 1, wherein the processor is further configured to execute the instructions to
   reset the operating schedule of the internal combustion engine and the rotary electrical machine when deviation occurs between an actual driving pattern in a nearest predetermined driving section and a projected driving pattern in a driving section estimated from information relating to the projected driving route.

3. The control device for a hybrid vehicle according to claim 2, wherein
   the nearest driving section is a driving section from when starting the vehicle to when stopping it.

* * * * *